US010037480B2

(12) United States Patent
van den Hengel et al.

(10) Patent No.: US 10,037,480 B2
(45) Date of Patent: Jul. 31, 2018

(54) METHOD FOR IMPROVING CLASSIFICATION RESULTS OF A CLASSIFIER

(75) Inventors: Anton John van den Hengel, Adelaide (AU); Benjamin William Ward, Adelaide (AU); Rhys Ernst Hill, Adelaide (AU)

(73) Assignee: LBT Innovations Limited, Adelaide (AU)

( * ) Notice: Subject to any disclaimer, the term of this patent is extended or adjusted under 35 U.S.C. 154(b) by 914 days.

(21) Appl. No.: 14/002,702

(22) PCT Filed: Mar. 2, 2012

(86) PCT No.: PCT/AU2012/000207
§ 371 (c)(1),
(2), (4) Date: Apr. 7, 2014

(87) PCT Pub. No.: WO2012/119188
PCT Pub. Date: Sep. 13, 2012

(65) Prior Publication Data
US 2014/0219553 A1    Aug. 7, 2014

(30) Foreign Application Priority Data

Mar. 4, 2011    (AU) ................ 2011900783

(51) Int. Cl.
*G06K 9/62*    (2006.01)
*G06T 7/11*    (2017.01)
*G06T 7/162*    (2017.01)

(52) U.S. Cl.
CPC .......... *G06K 9/628* (2013.01); *G06K 9/6224* (2013.01); *G06T 7/11* (2017.01); *G06T 7/162* (2017.01);
(Continued)

(58) Field of Classification Search
CPC .... G06K 9/628; G06K 9/6224; G06T 7/0081; G06T 7/0093; G06T 2207/20072; G06T 2207/10024
See application file for complete search history.

(56) References Cited

U.S. PATENT DOCUMENTS 4,847,786 A * 7/1989 Wang .................. G06K 9/4638
348/615
6,596,532 B1 * 7/2003 Hyman ................. C12M 25/14
435/177
(Continued)

FOREIGN PATENT DOCUMENTS

EP    1750226 A2    2/2007
JP    2006-317406 A    11/2006
(Continued)

OTHER PUBLICATIONS

WIPO, Australian International Search Authority, International Search Report dated May 14, 2012 in International Patent Application No. PCT/AU2012/000207, 2 pages.
(Continued)

*Primary Examiner* — Chan Park
*Assistant Examiner* — Elisa Rice
(74) *Attorney, Agent, or Firm* — Inskeep IP Group, Inc.

(57) ABSTRACT

A method for improving classification results of a classifier including receiving classification results for a plurality of elements that have been classified by a classifier as one of a plurality of classes, constructing a graph having a plurality of nodes, each node corresponding to one of the elements, and a plurality of labels, each label corresponding to one of the classes, adding edges between nodes corresponding to related elements, adding edges between each node and each label, and using a graph cut algorithm to cut edges to a node and partition the graph into classes, the graph cut algorithm
(Continued)

using as input the classification results for the element corresponding to that node and related elements.

16 Claims, 3 Drawing Sheets

(52) U.S. Cl.
    CPC ........... *G06T 2207/10024* (2013.01); *G06T 2207/20072* (2013.01)

(56) References Cited

U.S. PATENT DOCUMENTS

| | | | | |
|---|---|---|---|---|
| 2005/0249401 | A1* | 11/2005 | Bahlmann | G06K 9/6256 382/159 |
| 2006/0013509 | A1* | 1/2006 | Kee | G06K 9/00201 382/312 |
| 2006/0098871 | A1* | 5/2006 | Szummer | G06K 9/00422 382/173 |
| 2006/0147126 | A1* | 7/2006 | Grady | G06T 7/0081 382/274 |
| 2007/0025616 | A1* | 2/2007 | Grady | G06K 9/03 382/173 |
| 2007/0165949 | A1 | 7/2007 | Sinop et al. | |
| 2007/0282596 | A1* | 12/2007 | Suzuki | G06F 17/2775 704/9 |
| 2008/0019587 | A1* | 1/2008 | Wilensky | G06T 7/0083 382/159 |
| 2009/0116732 | A1* | 5/2009 | Zhou | H04N 13/0029 382/154 |
| 2010/0021069 | A1* | 1/2010 | Fan | G06K 9/00463 382/224 |
| 2012/0114240 | A1* | 5/2012 | Yamada | G06T 7/0081 382/173 |
| 2013/0109051 | A1* | 5/2013 | Li | C12M 41/46 435/34 |

FOREIGN PATENT DOCUMENTS

| | | | |
|---|---|---|---|
| JP | 2007-172224 A | 7/2007 | |
| JP | 2008-547097 A | 12/2008 | |
| JP | 2009-211138 A | 9/2009 | |
| JP | 2009-232962 A | 10/2009 | |
| JP | 2010-067252 A | 3/2010 | |
| JP | 2011-034178 A | 2/2011 | |
| WO | WO 2010112583 A1 * | 10/2010 | ............ C12M 41/36 |

OTHER PUBLICATIONS

Shotton et al., "TextonBoost: Joint Appearance, Shape and Context Modeling for Multi-class Object Recognition and Segmentation"; Computer Vision—ECCV 2006; *Lecture Notes in Computer Science*, 2006, vol. 3951/2006, 1-15; retrieved from http://webdocs.cs.ualberta.ca/~dana/readingMedIm/papers/CRF_TextonBoost_ECCV2_006.pdf on May 11, 2012, 14 pages.
Boykov et al., "Fast Approximate Energy Minimization via Graph Cuts; Pattern Analysis and Machine Intelligence, IEEE Transactions on", Nov. 2001; vol. 23, Issue: 11; pp. 1222-1239; retrieved from http://www.cs.cornell.edu/rdz/Papers/BVZ-pami01-final.pdf on May 11, 2012.
Dongfeng Han et al., "Certain Object Segmentation Based on AdaBoost Learning and Nodes Aggregation Iterative Graph-Cuts", Jan. 1, 2006, Articulated Motion and Deformable Objects Lecture Notes in Computer Science, LNCS, Springer, Berlin, DE, pp. 196-202.
Qiang Liu et al, "Automatic Body Segmentation with Graph Cut and Self-Adaptive Initialization Level Set (SAILS)", Journal of Visual Communication and Image Representation, Academic Press, Inc., US, vol. 22, No. 5, Feb. 2, 2011, pp. 367-377.
Dongfeng Han et al., "Automatic Segmentation Based on AdaBoost Learning and Graph-Cuts", Jan. 1, 2006, Image Analysis and Lecture Notes in Computer Science, LNCS, Springer, Berlin, DE, pp. 215-225.
Lombart H. et al., "A Multilevel Banded Graph Cuts Method for Fast Image Segmentation", Computer Vision, 2005, ICCV 2005, Tenth IEEE International Conference on Beijing, China Oct. 17-20, 2005, Piscataway, NJ, USA, IEEE, Los Alamitos, CA, USA, vol. 1, Oct. 17, 2005, pp. 259-265.
Yin Li et al., "Lazy Snapping", ACM Transactions on Graphics (TOG), ACM, US, vol. 23, No. 3, Jan. 1, 2004, pp. 303-308.
Moore A P et al., "Supeipixel Lattices", Computer Vision and Pattern Recognition, 2008, CVPR 2008, IEEE Conference on, IEEE, Piscataway, NJ, USA, Jun. 23, 2008, pp. 1-8.
Faliu Yi et al, "Image Segmentation: A Survey of Graph-Cut Mehtods", Systems and Informatics (ICSAI), 2012, International Conference on, IEEE, May 19, 2012, pp. 1936-1941.
Fujisaki, Tatsuya et al., "Automatic Object Extraction Using Graph Cuts with Visual Attention Cues", Technical Report of IEICE, Japan, The Institute of Electronics, Information and Communication Engineers (Ieice), Feb. 12, 2009, vol. 108, No. 432, pp. 145-150.
Nakaoka, Teruhisa et al., "Organ Segmentation from 3D Abdominal CT Images Using Likelihood Atlas of Organ Existence and Graph Cut", Technical Report of IEICE, Japan, The Institute of Electronics, Information and Communication Engineers (IEICE), Jan. 12, 2011, vol. 110, No. 364, pp. 223-228.
Soukejima Ryouta et al., "Analysis aiding for epigenetic mechanism by image processing", ITE technical report, Japan, The Institute of Image Information and Television Engineers, Feb. 27, 2010; vol. 34, No. 10, pp. 97-100.
Wei-Bang Chen et al., "An automated bacterial colony counting and classification system", Information Systems Frontiers, Germany, Springer Science+Business Media, LLC, Feb. 18, 2009; vol. 11, No. 4, pp. 349-368.
Song Zhuang et al. "Integrated Graph Cuts for Brain MRI Segmentation", MICCAI 2006, LNCS 4191, Jan. 1, 2006, pp. 831-838.

* cited by examiner (a) Initial graph    (b) Labelling after cut

METHOD FOR IMPROVING CLASSIFICATION RESULTS OF A CLASSIFIER

RELATED APPLICATIONS

This application claims priority to and is the U.S. National Phase of international patent application number PCT/AU2012/000207, International Filing Date 2 Mar. 2012, entitled Method For Improving Classification Results Of A Classifier, which claims priority to Australian Provisional Patent Application No. 2011900783 filed on 4 Mar. 2011, entitled Method For Improving Classification Results Of A Classifier, both of which are incorporated herein by reference in their entireties.

FIELD OF THE INVENTION

The present invention relates to methods and software for improving classification results of a classifier. The invention will be described with respect to its application in improving pixel or image classification results; however, it will be appreciated that the principles and concepts of the invention are equally applicable to other classification tasks.

BACKGROUND TO THE INVENTION

A classifier may be trained using a machine learning algorithm to classify a plurality of elements as one of a plurality of classes. The classifier makes a prediction of the classification of each element, and may also make an assessment of the confidence in the prediction.

One existing example of a classifier is a boosted classifier, which combines the output of a set of "weak" classifiers (with low, but better than random, classification accuracy) to produce a single "strong" classifier with high accuracy. In combining the weak classifiers, the result of each weak classifier is weighted according to the confidence in the correctness of the weak classifier. A boosting algorithm may adaptively improve the performance of the classifier by giving greater weight to examples misclassified by a weak classifier when training the next weak classifier.

Despite combining a number of weak classifiers, the strong classifier will not necessarily produce an accurate classification for a given problem. For example, if the boosted classifier is used to segment or select features in an image, some of the pixels in the image may be mislabelled, leading to noise in the resulting segmentation.

This noise may be cleaned up to an extent by using simple morphological filtering operations such as erosion and dilation of the labels to remove small regions of noise. Erosion decreases the size of objects and removes anomalies, dilation increases the size of objects and fills in holes. However, the standard formulation of these operations renders them simplistic in nature and hence they are unable to incorporate additional information when applied.

Other existing techniques include using a more sophisticated dilation technique to refine results. On each dilation step, the likelihood of points near the boundary of a segmented region belonging to that region is computed, and points with likelihoods above the threshold are added. The likelihood is based on image intensity within the region.

Another alternative is to use a colour watershed segmentation to improve classification results. The classification is used to extract seed points for each region. Watershed segmentation is then applied to expand these regions until all pixels have been labelled. This expansion is based on region colour information.

It is an aim of the present invention to provide an alternative method for improving classification results of a classifier.

The above discussion of background art is included to explain the context of the present invention. It is not to be taken as an admission that any of the documents or other material referred to was published, known or part of the common general knowledge at the priority date of any one of the claims of this specification.

SUMMARY OF THE INVENTION

The present invention provides a method for improving classification results of a classifier including:
  receiving classification results for a plurality of elements that have been classified by a classifier as one of a plurality of classes,
  constructing a graph having a plurality of nodes, each node corresponding to one of the elements, and a plurality of labels, each label corresponding to one of the classes,
  adding edges between nodes corresponding to related elements,
  adding edges between each node and each label, and
  using a graph cut algorithm to cut edges to a node and partition the graph into classes, the graph cut algorithm using as input the classification results for the element corresponding to that node and related elements.

Graph cut algorithms compute an optimal partition of a graph into two or more classes by minimising an energy function. In this case, the energy function uses as input the classification results for elements and their related elements. The application of the graph cut algorithm may lead to the reclassification of some of the elements that have been misclassified by the classifier, improving the classification results.

The classifier that performs the initial classification may be a multi-class classifier that has been applied to classify the elements as one of three or more classes. Accordingly, the graph cut algorithm may be a multi-class graph cut algorithm to partition the graph into three or more classes. A multi-class graph cut algorithm is more complicated than a binary graph cut, but allows a more meaningful classification of elements to be provided. Such an algorithm may include an alpha expansion procedure or an alpha beta expansion procedure as described in Yuri Boykov, Olga Veksler, and Ramin Zabih "*Fast approximate energy minimization via graph cuts*" IEEE Trans. Pattern Anal. Mach. Intell., 23:1222-1239, November 2001, the contents of which are herein incorporated by reference.

In alpha expansion, a series of graph cuts are performed, each time segmenting between the current label for each node, and a candidate label from the set of possible labels. This procedure is repeated, iterating through each possible label, until convergence. In constructing the graph, auxiliary nodes are added between adjacent nodes with different labels, to include the cost of this labelling in the cut.

The classifier may be a boosted classifier, which combines the output of a set of weak classifiers to produce a strong classifier. Alternatively, the classifier may be a decision tree, random forest, or may use Linear Discriminant Analysis (LDA) or any other technique to classify the elements.

The classification results from the classifier may include a confidence value for each element, indicating the confidence in the classification of that element and the graph cut algorithm may further use as input the confidence value of the classification for the element corresponding to that node. Additionally, the graph cut algorithm may further use as input the confidence value of the classification for related elements. The graph cut spatially smoothes the results, reducing noise in the classifications or labelling. In particular, the high confidence classifications will normally be kept, while low confidence classifications may be replaced to obtain a more homogeneous output. For example, if a low confidence element is surrounded by related elements classified into the same class with high confidence, there can be more confidence in the low confidence element's classification. By the same token, if the related elements are classified into a different class with high confidence, there is a strong case for changing the low confidence element's classification to that class.

The graph cut algorithm may further use as input a likelihood that related elements have the same classification. Thus, the energy function minimised by the graph cut algorithm may include terms based on the confidence that a given node has a given label and the likelihood that two adjacent nodes have different labels.

The elements being classified may be pixels in an image and related elements may be adjacent pixels in the image. Alternatively, the elements may be voxels in a 3D volume, for example from an MRI scan, and the related elements may be adjacent voxels. In another example, the elements could be documents being classified according to their content, and related elements could be pairs of documents where one contains a reference to the other.

In an example, the method may be used to clean up pixel classification results of a classifier trained to classify pixels in image data of a solid culture medium and any microbial growth (such as bacterial colonies) on the solid culture medium, such as described in the co-pending International application to the same Applicant and with the same filing date titled "Method and Software for Analysing Microbial Growth"; the contents of which are herein incorporated by reference. The method has also been found to improve the classification results for pixels, in the example, for which a boosted classifier has low confidence in its prediction in order to derive a more accurate microbiological assessment of the solid culture medium and any microbial growth.

It will be appreciated by those persons skilled in the art that the medium will usually be, for example, agar and will usually be contained in a container such as a plate, and, in a more specific example, a Petri dish, which may have a lid. The combination of the medium and the plate is hereinafter referred to throughout the specification as a "culture plate" which might sometimes be referred to in the art as an "agar plate".

In an embodiment, the related elements include eight adjacent pixels, so that in the graph each pixel is fully connected to surrounding pixels in the image. This would result in the most accurate partition of the graph but would be computationally expensive. To reduce computation and increase speed of the algorithm, edges may be added to only four adjacent pixels, for example the corner pixels may be connected to the middle pixel in a 3×3 block of pixels.

In yet another alternative for reducing computation, each element may be a contiguous region in, say, an image. Related elements may thus be adjacent contiguous regions in the image. An element may be a group of neighbouring pixels that have the same colour and lie within a boundary. In an image of bacterial colonies on a solid culture medium, for example, each circular region or colony detected by the classifier may be a node in the graph. Contiguous regions may also include pixels with the same classification and a confidence value above a threshold (for example, a threshold that defines a high confidence). This group of pixels may define a single element in the graph.

The graph cut algorithm may further use as input an expected size of an object in the image, such as the expected colony size for a type of bacteria on the solid culture medium. This would enable the graph cut algorithm to remove clusters much smaller than this size. Alternatively or additionally, the graph cut algorithm may further use as input a predetermined rule regarding neighbouring pixels. This rule may be obtained from an expert system, and may include prior information such as that certain bacteria types do not grow next to each other.

In addition, the present invention extends to software for use with a computer including a processor and memory for storing the software, the software including a series of instructions executable by the processor to carry out the method in accordance with any one of the embodiments described above.

The present invention also extends to a computer readable media including the software, and apparatus including a processor, a memory and software resident in memory accessible to the processor, the software executable by the processor to carry out the method in accordance with any one of the embodiments described above.

BRIEF DESCRIPTION OF THE DRAWINGS

Embodiments of the present invention will now be described, by way of example only, with reference to the accompanying drawings. It is to be understood that the particularity of the drawings does not supersede the generality of the preceding description of the invention.

DETAILED DESCRIPTION OF AN EMBODIMENT

Example Processing System

Figure 1:
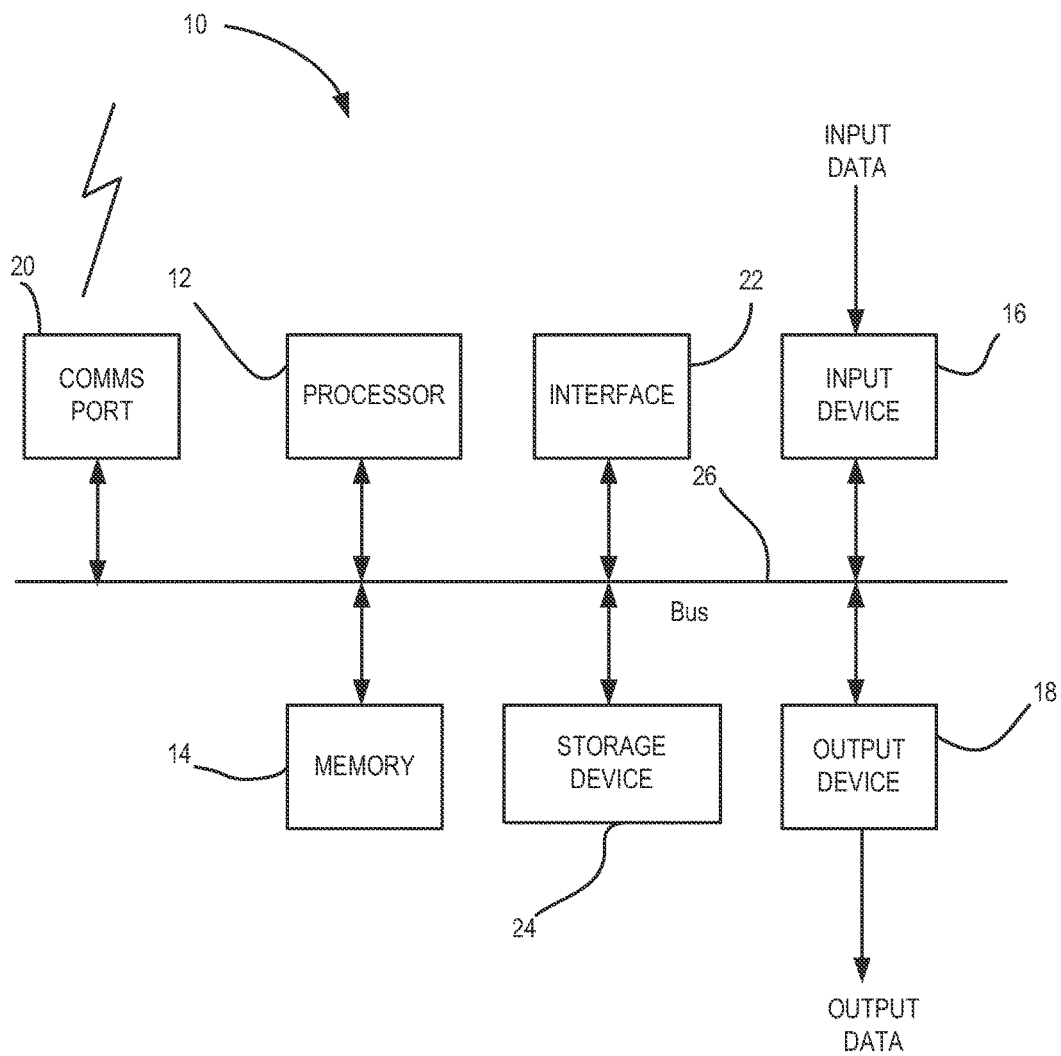
FIG. 1 is a functional block diagram of an example processing system for performing methods according to embodiments of the invention.

An example processing system for use with embodiments of the invention will be described with reference to FIG. 1. The processing system 10 includes a processor 12, a memory 14, at least one input device 16, at least one output device 18, a communications port 20, an interface 22 and a storage device 24. As is shown, the components of the processing system 10 are coupled together via a bus or group of buses 26.

The processor 12 may include more than one processing device, for example to handle different functions within the processing system 10. The memory 14 may include any suitable memory device and including, for example, volatile or non-volatile memory, solid state storage devices, magnetic devices, etc. The memory 14 may store instructions for execution by the processor 12.

Input device 16 receives input data and may include, for example, a keyboard, a mouse or other pointer device, a trackball, joystick or touch-screen, a microphone, a data receiver or antenna such as a modem or wireless data adaptor, data acquisition card, etc. An input device 16 may be operable by a user to enter input data, or it may receive data from another input data source.

Output device 18 produces or generates output data. Output device 18 may include a display device, a set of audio speakers, a printer, a port (for example a USB port), a peripheral component adaptor, a data transmitter or antenna such as a modem or wireless network adaptor, etc.

The storage device 24 can include any form of data or information storage means, for example, volatile or non-volatile memory, solid state storage devices, magnetic devices, etc. A file system and files may be stored on the storage device 24.

The communications port 20 allows the processing system 10 to communicate with other devices via a hard wired or wireless network. The interface 22 couples the processing system 10 to one or more peripheral devices. For example interface 22 may include a PCI card or PC card.

The processing system 10 may be any form of terminal, server processing system, specialised hardware, computer, computer system or computerised device, personal computer (PC), mobile or cellular telephone, mobile data terminal, portable computer, Personal Digital Assistant (PDA), pager or any other similar type of device.

Method for Improving Classification Results

A method for improving classification results of a classifier may be executed on processor 12 using software stored in the memory 14 or the storage device 24. An embodiment for cleaning up the classification results of a multi-class boosted decision tree classifier will be described, particularly a classifier used to classify pixels in image data of a solid culture medium on a culture plate and any microbial growth. Such a classifier is described in more detail in the co-pending application listed above and may be used to obtain a microbiological assessment of the solid culture medium and any microbial growth on the culture plate, e.g. detecting the presence or absence of bacterial colonies on the solid culture medium.

Figure 2:
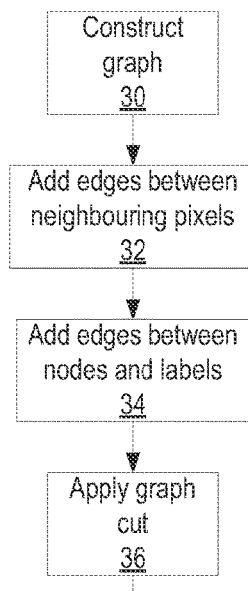
FIG. 2 is a flow chart of a method for applying a graph cut algorithm to improve classification results of a classifier.

With reference to FIG. 2, at step 30, a graph is constructed with each node corresponding to a pixel (or one of a sample of pixels) in the image data. Labels are also added, each label corresponding to a class. At step 32, edges are added between nodes corresponding to adjacent or neighbouring pixels, and at step 34 an edge is added between each node and each label. At step 36, the graph cut algorithm is used to cut edges to a node and partition the graph into classes, the graph cut algorithm using as input the pixel classification results for the pixel corresponding to that node and neighbouring pixels.

Figure 3:
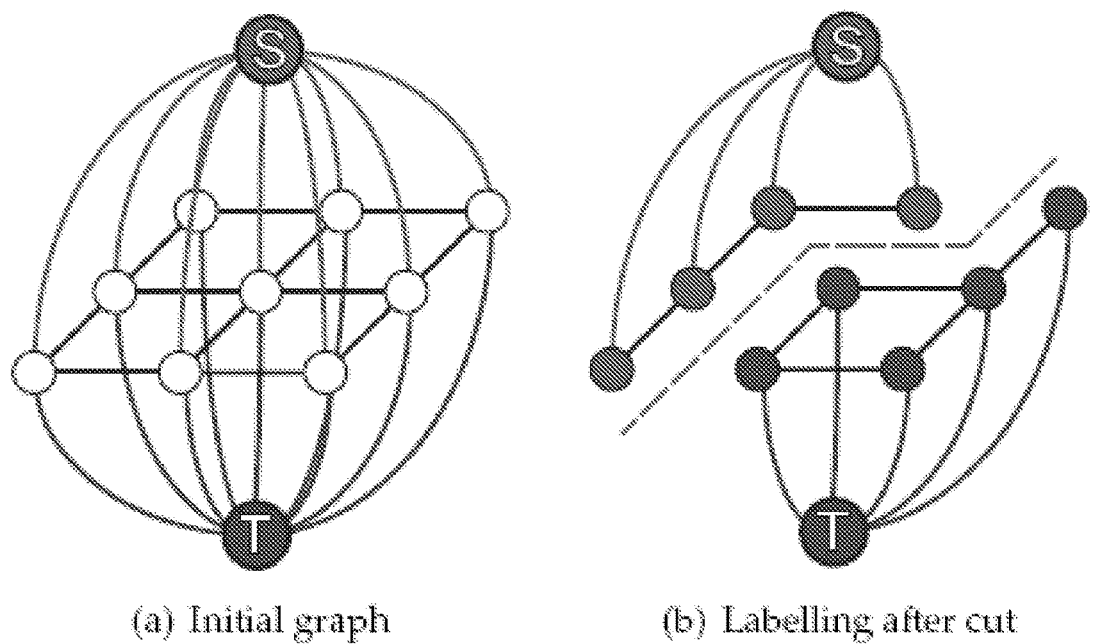
FIG. 3 shows (a) an initial graph and (b) a partitioned graph showing the labelling after a graph cut algorithm has been applied.

FIG. 3 shows an example of an initial graph (a) and the partitioned graph (b) showing the labelling after the cut. In FIG. 3, a source node S and sink node T correspond to the possible node labels. The graph cut determines a label for each node, cutting the edge between each node and the sink or source, and cutting edges between adjacent nodes with different labels. Each time a particular link is cut a cost is incurred. In computing the minimum cost cut, the graph cut procedure minimizes an energy function of the form:

$$E(l, x) = \sum_{i \in N} U(l_i, x_i) + \sum_{p,q \in M} V(l_p, l_q)$$

where l is the set of labels, N is the set of nodes, M is the set of all neighbouring nodes, x is the feature data, $U(l_i; x_i)$ assigns a cost to each node for each possible label assignment (implemented as a cost on cutting the edge to the source or sink), and $V(l_p, l_q)$ assigns a cost to each edge for assigning different labels to the attached nodes.

$$U(l_i, x_i) = \min(-\log(1, 0 - pl_i(x_i)), 20.0)$$

$pl_i(x_i)$ is the confidence in assigning label $l_i$ to feature vector $x_i$, computed with the formula for probability of correct classification in a multiclass classifier with J classes where h(x,k) is the classifier result for class k:

$$p_{l_i}(x) = \frac{e^{h(x,l_i)}}{\sum_{k=1}^{J} e^{h(x,k)}},$$

$$\sum_{k=1}^{J} h(x, k) = 0$$

while $$V(l_p, l_q) = \begin{cases} 20.0 & \text{if } l_p \neq l_q \\ 0 & \text{otherwise} \end{cases}$$

Other inputs into the graph cut algorithm may include image colour and edge data. Further, the expected colony size for a labelling could be included in the $U(l_i; x_i)$ cost assignment. Another factor that may be taken into account is a predetermined rule from an expert system, such as definitions of colony types that would not appear next to each other or are likely to appear together. This may be incorporated into the smoothness term $V(l_p, l_p)$.

If the number of possible labels is greater than 2, an alpha expansion procedure is used to perform a multiple class labelling from a binary labelling. Psuedocode for an alpha expansion procedure is given on page 2 of Yuri Boykov, Olga Veksler, and Ramin Zabih "*Fast approximate energy minimization via graph cuts*" *IEEE Trans. Pattern Anal. Mach. Intell.*, 23:1222-1239, November 2001 as shown below. The contents of this paper are to be taken as being incorporated herein by reference.

```
1.    Start with an arbitrary labeling f
2.    Set success := 0
3.    For each label α ∈ L
      3.1.  Find f̂ = arg min E(f') among f' within
            one α-expansion of f (Section 4)
      3.2.  If E(f̂) < E(f), set f := f̂
            and success := 1
4.    If success = 1 goto 2
5.    Return f
```

The procedure iterates over steps 3.1 and 3.2 for each of the possible classes of, for example, bacteria type or background, checking whether any labels in different classes could be switched to that class without increasing the total energy E of the graph. Once the procedure has been repeated for each class and no further energy reduction is possible, the optimal labelling is returned.

Figure 4:
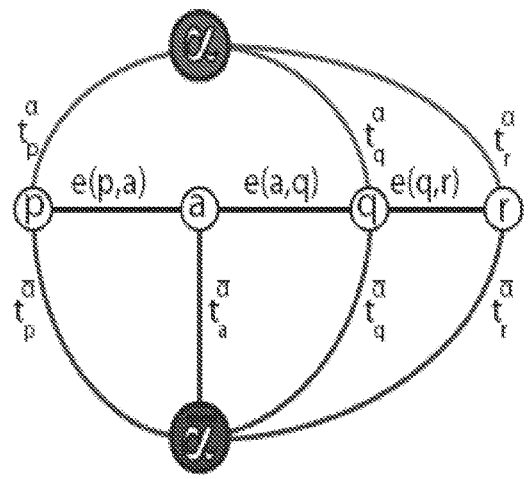
FIG. 4 shows a graph constructed with an auxiliary node for use in the alpha expansion procedure.
Figure 5:
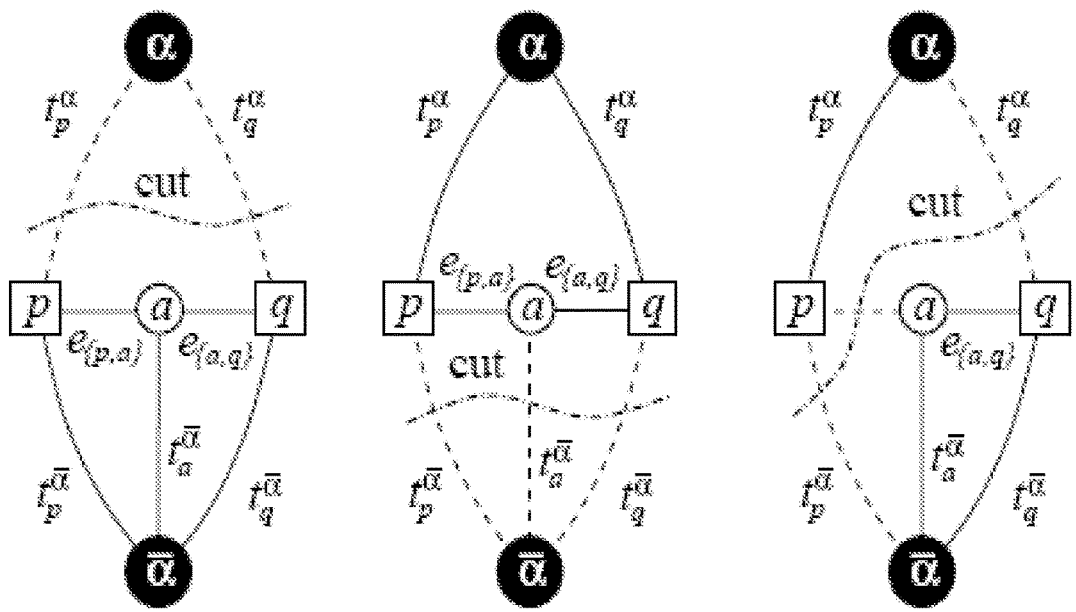
FIG. 5 is a set of graphs showing possible cuts that can be made in the alpha expansion procedure.

In constructing the graph, auxiliary nodes are added between adjacent nodes with different labels, to include the cost of this labelling in the cut. FIG. 4 shows the addition of an auxiliary node a between nodes p and q, and gives the edge weights for this graph. The cost of a cut is equal to the sum of its edge weights. For each pair of pixels, a cut must sever one of three groupings of edges, as shown in FIG. 5.

This diagram was taken from page 6 of Yuri Boykov, Olga Veksler, and Ramin Zabih's paper. The alpha expansion procedure determines which of the three groupings has the minimum edge weight and cuts these edges. A pixel is assigned the label alpha if the cut separates the pixel from the label alpha.

Once the graph cut has been performed, the resulting classifications of the pixels may be analysed to derive and output a microbiological assessment of microbial growth on the solid culture medium. This assessment may involve counting how many pixels are labelled in each class to determine the types and quantities of microbial growth on the culture plate. It also may involve assessing whether the number of pixels of a particular class is greater than a predetermined number.

It is to be understood that various alterations, additions and/or modifications may be made to the parts previously described without departing from the ambit of the present invention, and that, in the light of the above teachings, the present invention may be implemented in software, firmware and/or hardware in a variety of manners as would be understood by the skilled person.

The invention claimed is:

1. A method for improving classification results of a classifier including:
   receiving, using a processor, classification results for a plurality of elements that have been classified by a classifier as one of a plurality of classes;
   constructing, using a processor, a graph having a plurality of nodes, each node corresponding to one of the elements, and a plurality of labels, each label corresponding to one of the classes;
   adding, using a processor, edges between nodes corresponding to related elements;
   adding, using a processor, edges between each node and each label, and
   using a graph cut algorithm to cut edges to a node and partition the graph into classes, the graph cut algorithm using as input the classification results for the element corresponding to that node and the related elements for the element corresponding to that node, wherein:
   the classifier is a multi-class classifier that has been applied to classify the elements as one of three or more classes;
   the classification results include a confidence value for each element, indicating confidence in the classification of that element as each of the three or more classes;
   the graph cut algorithm further uses as input the confidence value of the classification for the element corresponding to that node so as to cut edges to a node and partition the graph into the three or more classes; and,
   each element is a pixel in an image of a solid culture medium and any microbial growth on the solid culture medium;
   the graph cut algorithm further uses as input the confidence value of the classification for related elements; and wherein the related elements are adjacent pixels in the image.

2. A method according to claim 1, wherein the classifier is a boosted classifier.

3. A method according to claim 1, wherein the graph cut algorithm further uses as input a likelihood that the related elements have the same classification.

4. A method according to claim 1, wherein the graph cut algorithm includes an alpha expansion procedure.

5. A method according to claim 1, wherein the related elements are eight adjacent pixels.

6. A method according to claim 1, wherein the related elements are four adjacent pixels.

7. A method according to claim 1, wherein each element is a contiguous region in the image.

8. A method according to claim 7, wherein the related elements are adjacent contiguous regions in the image.

9. A method according to claim 7, wherein each contiguous region includes pixels with the same classification and the confidence value is above a threshold.

10. A method according to claim 1, wherein the graph cut algorithm further uses as input an expected size of an object in the image.

11. A method according to claim 1, wherein the graph cut algorithm further uses as input a predetermined rule regarding adjacent pixels.

12. A method according to claim 1, wherein two of the three or more classes include a classification that a pixel in the image is microbial growth and a classification that a pixel in the image is not microbial growth.

13. A method according to claim 12, wherein one class of the three or more classes includes a classification that a pixel in the image is a background corresponding to not microbial growth.

14. A method according to claim 12, wherein one further class of the three or more classes includes a classification that a pixel in the image is a type of the microbial growth.

15. A non-transitory computer readable media including software for use with a computer including a processor and memory for storing the software, the software including a series of instructions executable by the processor to carry out a method for improving classification results of a classifier, the method including:
   receiving, using a processor, classification results for a plurality of elements that have been classified by a classifier as one of a plurality of classes,
   constructing, using a processor, a graph having a plurality of nodes, each node corresponding to one of the elements, and a plurality of labels, each label corresponding to one of the classes,
   adding, using a processor, edges between nodes corresponding to related elements,
   adding, using a processor, edges between each node and each label, and
   using a graph cut algorithm to cut edges to a node and partition the graph into classes, the graph cut algorithm using as input the classification results for the element corresponding to that node and the related elements for the element corresponding to that node, wherein
   the classifier is a multi-class classifier that has been applied to classify the elements as one of three or more classes, and
   the classification results include a confidence value for each element, indicating confidence in the classification of that element as each of the three or more classes,
   the graph cut algorithm further uses as input the confidence value of the classification for the element corresponding to that node so as to cut edges to a node and partition the graph into the three or more classes, and
   wherein each element is a pixel in an image of a solid culture medium and any microbial growth on the solid culture medium;
   the graph cut algorithm further uses as input the confidence value of the classification for related elements; and
   the related elements are adjacent pixels in the image.

16. An apparatus comprising:
    a processor;

a memory; and software resident in memory accessible to the processor, the software including a series of instructions executable by the processor to carry out a method for improving classification results of a classifier, the method including:

receiving, using a processor, classification results for a plurality of elements that have been classified by a classifier as one of a plurality of classes, constructing, using a processor, a graph having a plurality of nodes, each node corresponding to one of the elements, and a plurality of labels, each label corresponding to one of the classes, adding, using a processor, edges between nodes corresponding to related elements, adding, using a processor, edges between each node and each label, and using a graph cut algorithm to cut edges to a node and partition the graph into classes, the graph cut algorithm using as input the classification results for the element corresponding to that node and the related elements for the element corresponding to that node, wherein the classifier is a multi-class classifier that has been applied to classify the elements as one of three or more classes, and the classification results include a confidence value for each element, indicating confidence in the classification of that element as each of the three or more classes, the graph cut algorithm further uses as input the confidence value of the classification for the element corresponding to that node so as to cut edges to a node and partition the graph into the three or more classes, and wherein each element is a pixel in an image of a solid culture medium and any microbial growth on the solid culture medium;

the graph cut algorithm further uses as input the confidence value of the classification for related elements; and the related elements are adjacent pixels in the image.

\* \* \* \* \*